United States Patent
Lopez et al.

(10) Patent No.: US 8,929,865 B2
(45) Date of Patent: *Jan. 6, 2015

(54) OPTIMIZING USER DEVICE CONTEXT FOR MOBILITY MANAGEMENT ENTITY (MME) RESILIENCY

(71) Applicant: Verizon Patent and Licensing Inc., Basking Ridge, NJ (US)

(72) Inventors: Javier M. Lopez, Alameda, CA (US); Phillip A. Ritter, Danville, CA (US); Imtiyaz Shaikh, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/251,010

(22) Filed: Apr. 11, 2014

(65) Prior Publication Data

US 2014/0219178 A1 Aug. 7, 2014

Related U.S. Application Data

(62) Division of application No. 13/354,760, filed on Jan. 20, 2012, now Pat. No. 8,700,002.

(51) Int. Cl.
| | | |
|---|---|---|
| *H04W 12/06* | (2009.01) | |
| *H04W 68/00* | (2009.01) | |
| *H04W 12/08* | (2009.01) | |
| *H04W 36/00* | (2009.01) | |
| *H04W 8/30* | (2009.01) | |

(52) U.S. Cl.
CPC ............ *H04W 68/005* (2013.01); *H04W 12/08* (2013.01); *H04W 36/0038* (2013.01); *H04W 8/30* (2013.01)
USPC .......... 455/411; 455/435.1; 370/221; 370/272

(58) Field of Classification Search
CPC . H04W 8/30; H04W 36/0038; H04W 68/005; H04W 12/08
USPC ........... 455/435.1, 411, 436, 422.1, 410, 423, 455/450, 432.1, 418; 370/331, 252, 329, 370/328, 312, 254, 221, 272; 715/153
See application file for complete search history.

(56) References Cited

U.S. PATENT DOCUMENTS

| | | | | |
|---|---|---|---|---|
| 8,359,025 | B2* | 1/2013 | Yang et al. ................ | 455/426.1 |
| 8,391,241 | B2* | 3/2013 | Vikberg et al. ............. | 370/331 |
| 8,457,635 | B2* | 6/2013 | Bachmann et al. ......... | 455/436 |
| 8,488,559 | B2* | 7/2013 | Turanyi ...................... | 370/331 |
| 2009/0061878 | A1* | 3/2009 | Fischer ....................... | 455/436 |
| 2010/0284349 | A1* | 11/2010 | Niemela et al. ............. | 370/329 |
| 2011/0235505 | A1* | 9/2011 | Eswara et al. .............. | 370/221 |
| 2012/0159151 | A1* | 6/2012 | Janakiraman et al. ...... | 713/153 |

* cited by examiner

Primary Examiner — Mahendra Patel

(57) ABSTRACT

A first mobility management entity (MME) device receives an attachment request that includes information associated with a user device. The first MME device creates a context for the user device based on the information, stores the context, and creates an optimized context based on the context, wherein a size of the optimized context is smaller than a size of the context. The first MME device also identifies a second MME device that is a backup for the first MME device, and transmits the optimized context to the second MME device.

20 Claims, 7 Drawing Sheets

OPTIMIZING USER DEVICE CONTEXT FOR MOBILITY MANAGEMENT ENTITY (MME) RESILIENCY

CROSS-REFERENCE TO RELATED APPLICATION

This application is a divisional of U.S. patent application Ser. No. 13/354,760, filed Jan. 20, 2012, the disclosure of which is hereby incorporated herein in its entirety.

BACKGROUND

Wireless communication services, such as voice over long term evolution (VoLTE), continue to increase in popularity. Mobile user devices access these services via a cellular network. A mobile device connects to the cellular network via a base station, such as an evolved Node B (eNB), when the mobile device is within a geographic area associated with the base station. A mobility management entity (MME) stores a context for the mobile device when the mobile device attaches to the cellular network via the base station. The context includes information about the mobile device and information about how the mobile device is connected to the cellular network (e.g., via which base station). The MME can use the context to allow the mobile device to, for example, receive traffic associated with one of the wireless communication services, via the cellular network. Currently, only one MME stores context for a single mobile device at one time. Therefore, when the one MME fails, no other MME stores context for the mobile device. As a result, the mobile device cannot receive any new traffic until the mobile device reattaches to the cellular network, which can take a considerable amount of time (e.g., up to 30 minutes).

DETAILED DESCRIPTION OF PREFERRED EMBODIMENTS

The following detailed description refers to the accompanying drawings. The same reference numbers in different drawings may identify the same or similar elements.

Systems and/or methods described herein may optimize user device context for MME resiliency. For example, a user device may attach to a cellular network via a MME, and the MME may store a context for the user device. The MME may create an optimized context for the user device based on the context. For example, the optimized context may include less information than the context and may be of a smaller size than the context. The MME may transmit the optimized context to another MME, and the other MME may store the optimized context. A serving gateway (SGW) may receive traffic destined for the user device, and may determine that the MME is not operational. Thereafter, the SGW may transmit a notification, for the traffic, to the other MME. The other MME may use the optimized context to establish a connection between the SGW and the user device. The SGW may transmit the traffic to the user device via the connection.

As a result, the SGW can transmit the traffic to the user device when the MME, which stores the context for the user device, becomes non-operational. The SGW does not have to wait until the user device reattaches to the cellular network before transmitting the traffic to the user device. The other MME may also conserve storage space by storing the optimized context, instead of the context, for the user device since the optimized context may include less information than the context.

Figure 1:
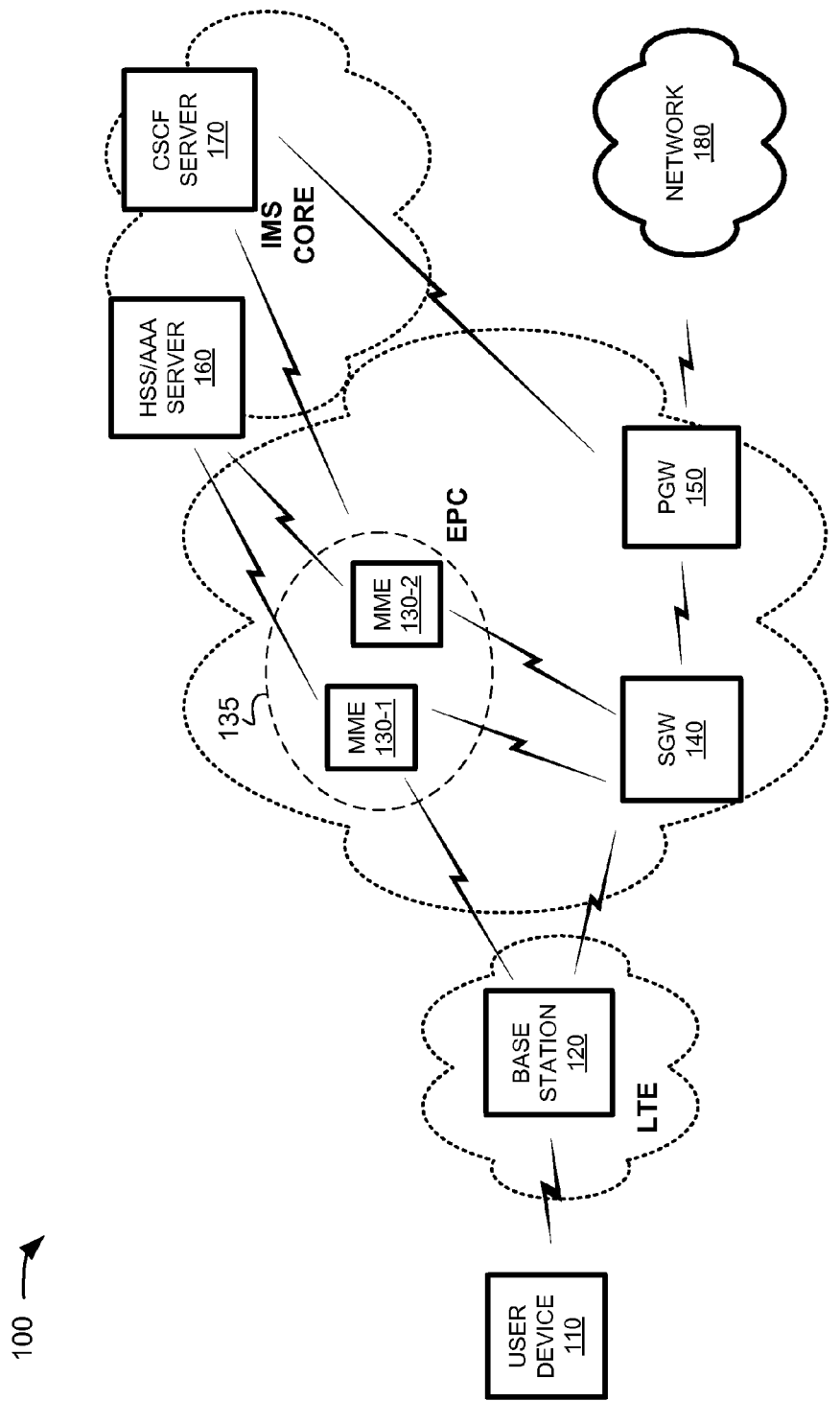
FIG. 1 is a diagram of an example environment in which systems and/or methods described herein may be implemented.

FIG. 1 is a diagram of an example environment 100 in which systems and/or methods described herein may be implemented. As shown in FIG. 1, environment 100 may include a user device 110, a base station 120, mobility management entity (MME) devices 130, a SGW 140, a packet data network (PDN) gateway (PGW) 150, a home subscriber server (HSS)/authentication, authorization, accounting (AAA) server 160, a call session control function (CSCF) server 170, and a network 180. One user device 110, one base station 120, two MME devices 130, one SGW 140, one PGW 150, one HSS/AAA server 160, one CSCF server 170, and one network 180 have been illustrated in FIG. 1 for simplicity. In practice, there may be more user devices 110, base stations 120, MME devices 130, SGW devices 140, PGW devices 150, HSS/AAA servers 160, CSCF servers 170, and/or networks 180.

In one implementation, environment 100 may include an evolved packet system (EPS) that includes a long term evolution (LTE) network and/or an evolved packet core (EPC) network that operate based on a third generation partnership project (3GPP) wireless communication standard. The LTE network may be a radio access network (RAN) that includes one or more base stations 120, such as evolved Node Bs (eNBs), via which user device 110 communicates with the EPC. The EPC network may include MME devices 130, SGWs 140, and/or PGWs 150 that enable user device 110 to communicate with network 180 and/or an Internet protocol (IP) multimedia subsystem (IMS) core network. The IMS core network may include HSS/AAA server 160 and/or CSCF server 170, and may manage authentication, session initiation, account information, profile information, etc. associated with user devices 110.

User device 110 may include any device that is capable of communicating with MME device 130 and/or SGW 140 via base station 120. For example, user device 110 may include a mobile communication device, such as a radiotelephone; a personal communications system (PCS) terminal that may, for example, combine a cellular radiotelephone with data processing and data communications capabilities; a personal digital assistant (PDA) that can include, for example, a radiotelephone, a pager, Internet/intranet access, etc.; a wireless device; a smart phone; a tablet computer; a laptop computer with a wireless air card; a global positioning system (GPS) device; a content recording device (e.g., a camera, a video camera, etc.); a voice over Internet protocol (VoIP) device; an analog terminal adaptor (ATA); etc. User device 110 may attach to MME device 130, and may use the attachment to send traffic to and/or receive traffic from, for example, network 180.

Base station 120 may include one or more devices that receive, process, and/or transmit traffic, such as voice, video, text, and/or other data destined for and/or received from user device 110. Base station 120 may combine the functionalities of a base station and/or a radio network controller (RNC) in second generation (2G) or third generation (3G) radio access networks. In one example implementation, base station 120 may be an eNB associated with the LTE network that receives traffic from and/or sends traffic to network 180 via SGW 140 and PGW 150. Base station 120 may send traffic to and/or receive traffic from user device 110 via an air interface. Alternatively, or additionally, base station 120 may forward an attachment request from user device 110 to MME device 130.

MME device 130 may include one or more devices that gather, process, search, store, and/or provide information in a manner described herein. In one implementation, MME device 130 may provide control plane processing for the EPC network of environment 100. For example, MME device 130 may implement tracking and paging procedures for user device 110, may activate and deactivate bearers for user device 110, may authenticate a user of user device 110, and may interface with non-LTE radio access networks.

Two or more MME devices 130 may make up a pool 135 of MME devices 130. A particular MME device 130 (e.g., MME device 130-1) may interface with another MME device 130 (e.g., MME device 130-2) in pool 135 via an S10 interface and/or another type of link. Pool 135 may include two or more MME devices 130 that serve a particular geographic area that includes base station 120 and/or user device 110. For example, MME device 130-1 may store a context for user device 110. MME device 130-1 may generate an optimized context based on the context, and may transmit, via the S10 interface and/or the other type of link, the optimized context to MME device 130-2. The optimized context may include less information than the context because MME device 130-1 may not include extraneous information from the context in the optimized context when MME device 130-1 generates the optimized context. MME device 130-2 may store the optimized context, and may use the optimized context to connect user device 110 and SGW 140 via base station 120 when MME device 130-1 becomes non-operational.

SGW 140 may include one or more devices that gather, process, search, store, and/or provide information in a manner described herein. In one implementation, SGW 140 may, for example, aggregate traffic received from one or more base stations 120, and may send the aggregated traffic to network 180 (e.g., via PGW 150) and/or other devices associated with the EPC network. SGW 140 may also receive traffic from network 180 and/or the other devices, and may send the received traffic to user device 110 via base station 120.

PGW 150 may include one or more devices that gather, process, search, store, and/or provide information in a manner described herein. In one example implementation, PGW 150 may include a device that aggregates traffic received from one or more SGWs 140, and may send the aggregated traffic to network 180. In another example implementation, PGW 150 may receive traffic from network 180, and may send the traffic to user device 110 via SGW 140 and base station 120.

HSS/AAA server 160 may include one or more devices that gather, process, search, store, and/or provide information in a manner described herein. For example, HSS/AAA server 160 may manage, update, and/or store, in a memory associated with HSS/AAA server 160, profile information, associated with user device 110, that identifies applications and/or services that are permitted for and/or accessible by user device 110; information associated with a user of user device 110 (e.g., a username, a password, a personal identification number (PIN), etc.); rate information; minutes allowed; and/or other information. Additionally, or alternatively, HSS/AAA server 160 may perform authentication, authorization, and/or accounting (AAA) operations associated with a communication session with user device 110. MME device 130 may receive authorization from HSS/AAA server 160, in response to an attachment request from user device 110, before MME device 130 creates and stores a context for user device 110.

CSCF server 170 may include one or more devices that gather, process, search, store, and/or provide information in a manner described herein. CSCF server 170 may process and/or route calls to and from user device 110 via the EPC network. For example, CSCF server 170 may process calls that are destined for user device 110. In another example, CSCF server 170 may process calls, received from user device 110, that are destined for other user devices (not shown in FIG. 1).

Network 180 may include one or more wired and/or wireless networks. For example, network 180 may include a cellular network, a public land mobile network (PLMN), a second generation (2G) network, a third generation (3G) network, a fourth generation (4G) network, a fifth generation (5G) network, and/or another network. Additionally, or alternatively, network 180 may include a wide area network (WAN), a metropolitan network (MAN), an ad hoc network, an intranet, the Internet, a fiber optic-based network (e.g., a FiOS network), and/or a combination of these or other types of networks. Additionally, or alternatively, network 180 may include, or connect to, an external IP network. The external IP network may include, for example, an IMS network, which may provide voice and multimedia services to user device 110, based on the Session Initiation Protocol (SIP). Herein, a cellular network may refer to a portion of environment 100 and/or one or more other networks.

Although FIG. 1 shows example devices/networks of environment 100, in other implementations, environment 100 may include fewer devices/networks, different devices/networks, differently arranged devices/networks, and/or additional devices/networks than depicted in FIG. 1. Alternatively, or additionally, one or more devices of environment 100 may perform one or more tasks described as being performed by one or more other devices of environment 100.

Figure 2:
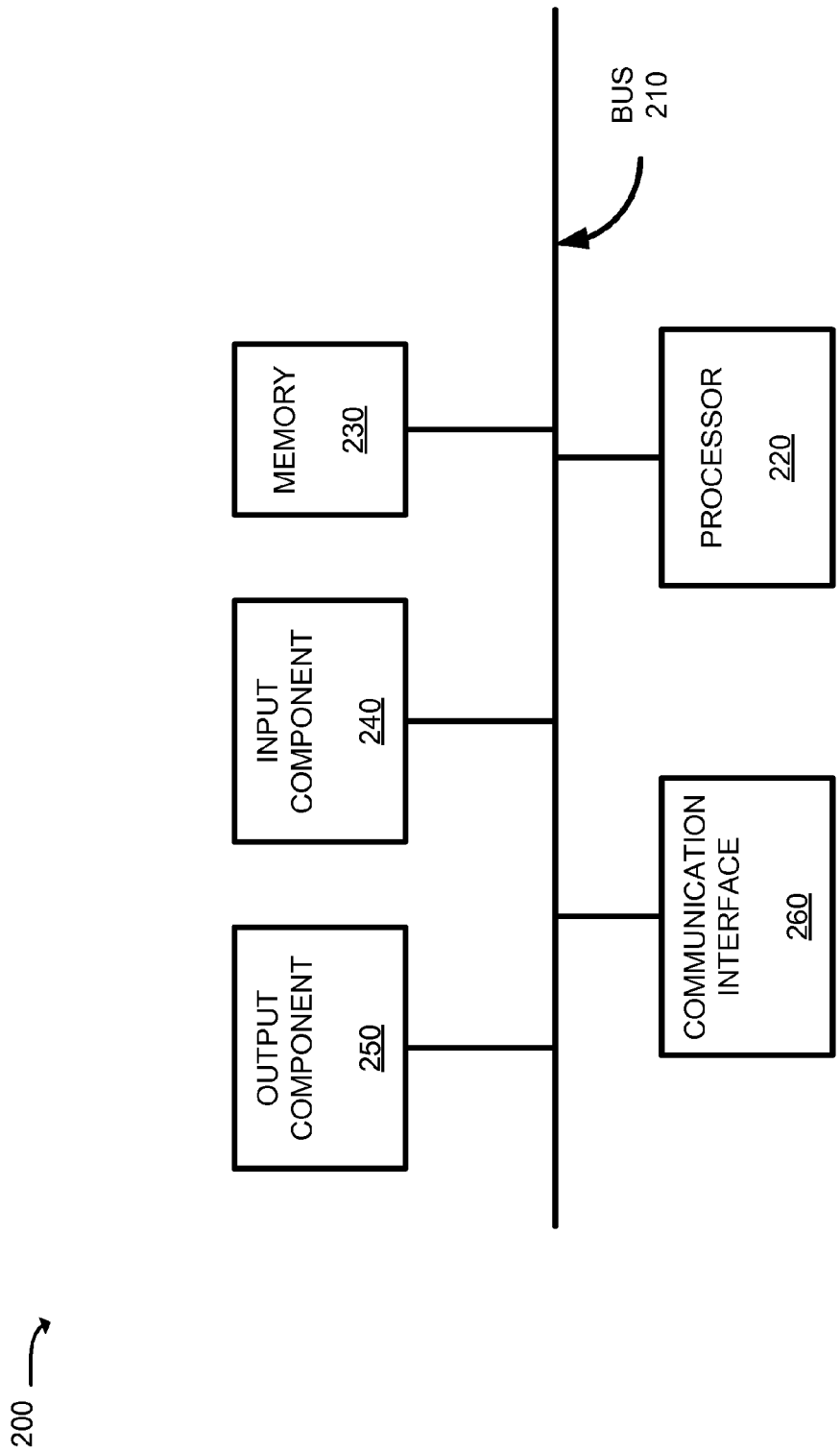
FIG. 2 is a diagram of example components of a device that may correspond to one of the devices of the environment depicted in FIG. 1.

FIG. 2 is a diagram of example components of a device 200. Device 200 may correspond to user device 110, MME device 130, SGW 140, PGW 150, HSS/AAA server 160, and/or CSCF server 170. Alternatively, or additionally, each of user device 110, MME device 130, SGW 140, PGW 150, HSS/AAA server 160, and/or CSCF server 170 may include one or more devices 200 and/or one or more components of device 200.

As shown in FIG. 2, device 200 may include a bus 210, a processor 220, a memory 230, an input component 240, an output component 250, and a communication interface 260. In other implementations, device 200 may contain fewer components, additional components, different components, or differently arranged components than depicted in FIG. 2. Additionally, or alternatively, one or more components of device 200 may perform one or more tasks described as being performed by one or more other components of device 200.

Bus 210 may include a path that permits communication among the components of device 200. Processor 220 may include a processor, microprocessor, or processing logic that may interpret and execute instructions. Memory 230 may include any type of dynamic storage device that may store information and instructions, for execution by processor 220, and/or any type of non-volatile storage device that may store information for use by processor 220.

Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc.

Communication interface 260 may include any transceiver-like mechanism that enables device 200 to communicate with other devices and/or systems. For example, communication interface 260 may include an Ethernet interface, an optical interface, a coaxial interface, a wireless interface, or the like.

In another implementation, communication interface 260 may include, for example, a transmitter that may convert baseband signals from processor 220 to radio frequency (RF) signals and/or a receiver that may convert RF signals to baseband signals. Alternatively, communication interface 260 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications. Communication interface 260 may connect to an antenna assembly (not shown in FIG. 2) for transmission and/or reception of the RF signals.

The antenna assembly may include one or more antennas to transmit and/or receive RF signals over the air. The antenna assembly may, for example, receive RF signals from communication interface 260 and transmit them over the air, and receive RF signals over the air and provide them to communication interface 260. In one implementation, for example, communication interface 260 may communicate with network 180 and/or devices connected to network 180.

As will be described in detail below, device 200 may perform certain operations. Device 200 may perform these operations in response to processor 220 executing software instructions (e.g., computer program(s)) contained in a computer-readable medium, such as memory 230, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
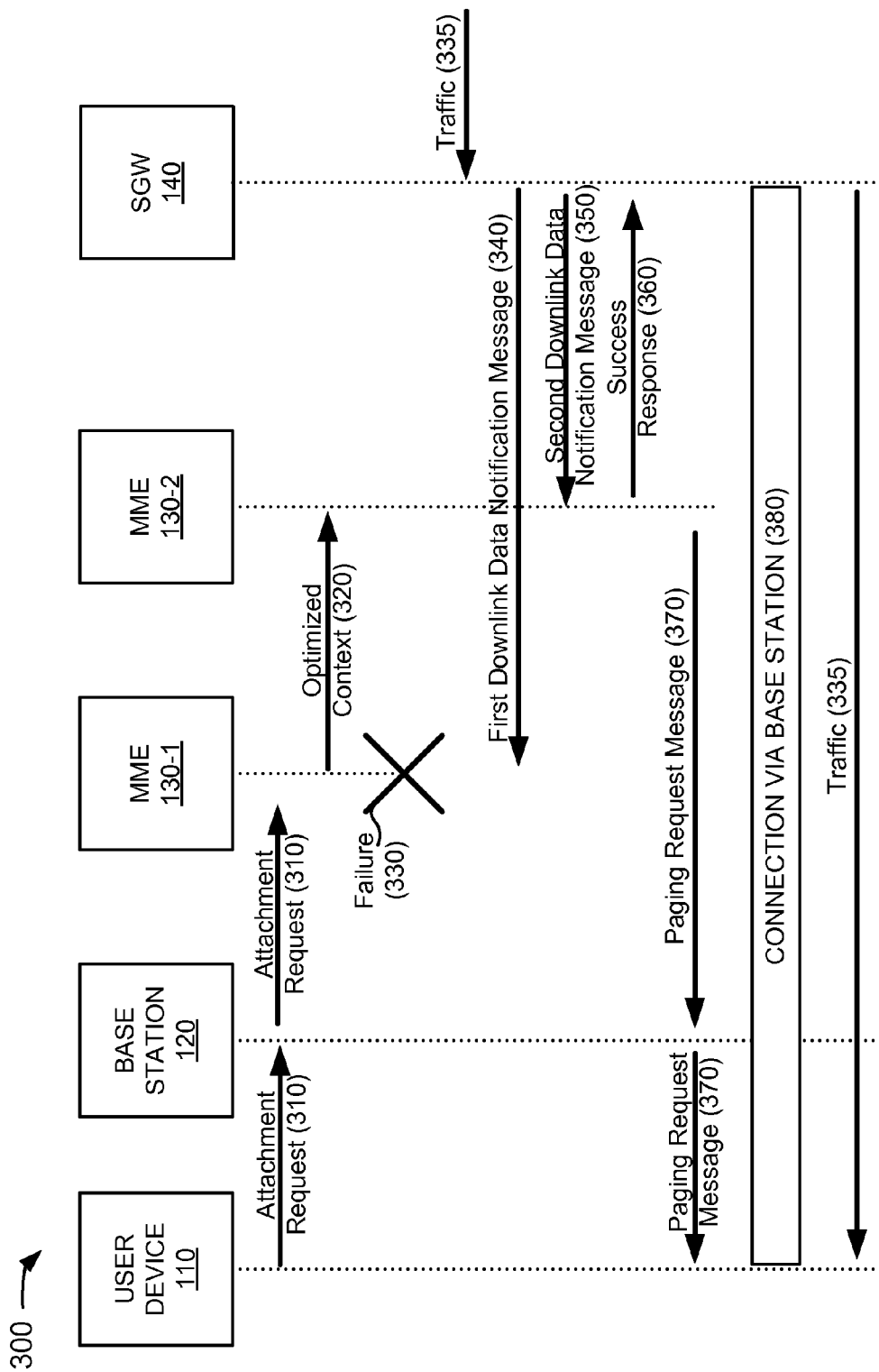
FIG. 3 is a flow diagram of example operations capable of being performed by an example portion of the environment in FIG. 1.

FIG. 3 is a flow diagram of example operations capable of being performed by an example portion 300 of environment 100. As shown in FIG. 3, portion 300 may include user device 110, base station 120, MME device 130-1, MME device 130-2, and SGW 140.

As further shown in FIG. 3, when a user (not shown in FIG. 3) initializes user device 110, user device 110 may transmit an attachment request 310 to base station 120 in order to attach to a cellular network associated with base station 120. Attachment request 310 may include information associated with user device 110, such as an international mobile subscriber identifier (IMSI), a mobile equipment identifier (MEID), credentials, security keys required for authentication and/or encryption, etc. Base station 120 may receive attachment request 310, and may forward attachment request 310 to MME device 130-1.

MME device 130-1 may receive attachment request 310, and may transmit an authorization request to HSS/AAA server 160 (not shown in FIG. 3). The authorization request may include information that identifies user device 110 and/or a request for subscriber profile information associated with user device 110. In one implementation, MME device 130-1 may receive an authorization response (not shown in FIG. 3), from HSS/AAA server 160, that indicates that user device 110 is authorized to attach to the cellular network via MME device 130-1. The authorization response may include the subscriber profile information associated with user device 110. MME device 130-1 may determine, based on the authorization response, that user device 110 is authorized to attach to the cellular network via MME device 130-1.

In another implementation, MME device 130-1 may receive, in response to the authorization request, a challenge and a challenge answer (not shown in FIG. 3) from HSS/AAA server 160. MME device 130-1 may transmit the challenge to user device 110 via base station 120, and may receive a challenge response, to the challenge, from user device 110. MME device 130-1 may determine that user device 110 is authorized to attach to the cellular network via MME device 130-1 when the challenge response matches the challenge answer received from HSS/AAA server 160.

After determining that user device 110 is authorized to attach to the cellular network via MME device 130-1, MME device 130-1 may create a context for user device 110, and may store the context. The context may include information from attachment request 310, such as the IMSI, the MEID, the credentials, the security keys, etc.; one or more portions of the subscriber profile information; and/or an identifier of base station 120 via which MME device 130-1 received attachment request 310 from user device 110.

MME device 130-1 may further create an optimized context 320, for user device 110, based on the context. Optimized context 320 may include a subset of the information included in the context. In other words, optimized context 320 may include less information and be of a smaller size than the context. For example, optimized context 320 may only include the IMSI, one of the security keys, and/or the identifier of base station 120.

MME device 130-1 may determine that MME device 130-2 serves as a back-up for MME device 130-1. As further shown in FIG. 3, MME device 130-1 may transmit optimized context 320 to MME device 130-2. MME device 130-2 may store optimized context 320 for user device 110.

After MME device 130-2 stores optimized context 320, MME device 130-1 may experience a failure, as indicated by reference number 330. When failure 330 occurs, MME device 130-1 may no longer respond to messages from SGW 140. As a result, MME device 130-1 may not use the context stored for user device 110 to connect SGW 140 to user device 110 via base station 120.

As also shown in FIG. 3, SGW 140 may receive traffic 335 that is destined for user device 110 (e.g., from PGW 150 or another network device). SGW 140 may determine that MME device 130-1 primarily serves user device 110. SGW 140 may generate a first downlink data notification message 340, and may transmit first downlink data notification message 340 to MME device 130-1. First downlink data notification message 340 may indicate that SGW 140 is requesting to transmit traffic 335 to user device 110. SGW 140 may transmit first downlink data notification message 340 to MME device 130-1 one or more times until SGW 140 determines that MME device 130-1 is not operational due to failure 330. For example, SGW 140 may determine that MME device 130-1 is not operational when SGW 140 fails to receive any response to first downlink data notification message 340 after SGW 140 transmits first downlink data notification message 340 to MME device 130-1 a particular number of times.

When SGW 140 determines that MME device 130-1 is not operational, SGW 140 may determine that MME device 130-2 serves as a backup MME device for user device 110. SGW 140 may generate a second downlink data notification message 350, and may transmit second downlink data notification message 350 to MME device 130-2. Second downlink data notification message 350 may include the same type of information as included in first downlink data notification message 340. Accordingly, second downlink data notification message 350 may also indicate that SGW 140 is requesting to transmit traffic 335 to user device 110. SGW 140 may transmit second downlink data notification message 350 to MME device 130-2 one or more times until SGW 140 receives a response (e.g., a success response 360), from MME device 130-2, to second downlink data notification message 350.

In one example implementation, MME device 130-2 may receive second downlink data notification message 350. MME device 130-2 may determine that, while MME device 130-2 does not store a context for user device 110, MME device 130-2 stores optimized context 320 for user device 110. MME device 130-2 may identify base station 120 based on the identifier of base station 120 that is included in optimized context 320. MME device 130-2 may generate success response 360 when MME device 130-2 determines that MME device 130-2 stores optimized context 320. Success response 360 may indicate that MME device 130-2 stores information (i.e., optimized context 320) for user device 110, and may include the identifier of base station 120 and/or any other information required for SGW 140 to transmit traffic 335 to user device 110. MME device 130-2 may transmit success response 360 to SGW device 140.

Furthermore, when MME device 130-2 determines that MME device 130-2 stores optimized context 320 for user device 110, MME device 130-2 may generate a paging request message 370 based on second downlink data notification message 350 and optimized context 320. Paging request message 370 may indicate that SGW 140 is requesting to transmit traffic 335 via base station 120 to user device 110. Paging request message 370 may include an identifier associated with SGW 140, an identifier associated with base station 120, and/or an identifier associated with user device 110. MME device 130-2 may transmit paging request message 370 to base station 120, and base station 120 may forward paging request message 370 to user device 110.

In response to paging request message 370, user device 110 may establish a connection 380 with SGW 140 via base station 120. Connection 380 may include a radio resource control (RRC) connection between user device 110 and base station 120. After connection 380 is established, SGW device 140 may transmit traffic 335 via connection 380 to user device 110, and user device 110 may receive traffic 335.

Alternatively, or additionally, MME device 130-1 may transmit optimized context 320 to a storage device, such as a dedicated server (not shown in FIG. 1 or FIG. 3), and the storage device may store optimized context 320. When MME device 130-2 receives second downlink data notification message 350 from SGW device 140, MME device 130-2 may retrieve optimized context 320 from the storage device.

Figure 4:
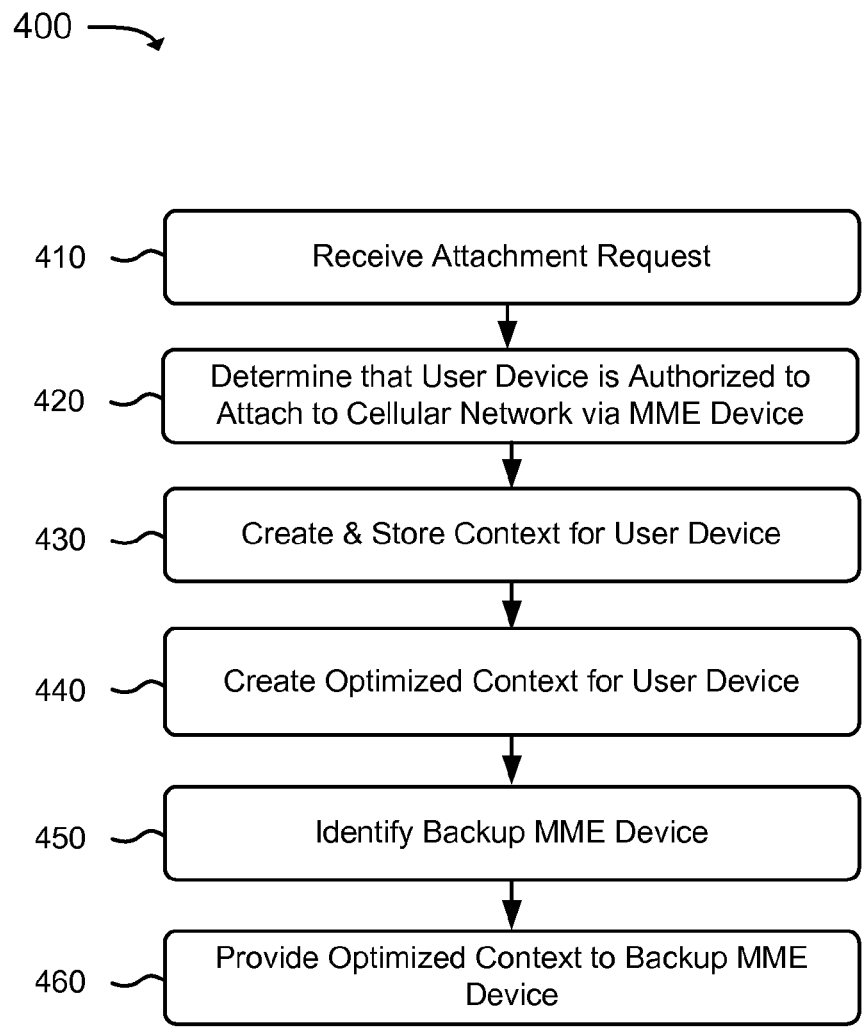
FIG. 4 is a flow chart of an example process for providing an optimized context to a backup MME device.

FIG. 4 is a flow chart of an example process 400 for generating an optimized context for a user device. In one implementation, process 400 may be performed by MME device 130-1. Alternatively, or additionally, some or all of process 400 may be performed by another device or group of devices, including or excluding MME device 130-1.

As shown in FIG. 4, process 400 may include receiving an attachment request (block 410). For example, base station 120 may receive attachment request 310 (FIG. 3) from user device 110. Attachment request 310 may include information associated with user device 110 and a request to attach to a cellular network associated with base station 120. Base station 120 may identify MME device 130-1, of pool 135, and may forward attachment request 310 to MME device 130-1. MME device 130-1 may receive attachment request 310 from base station 120.

Process 400 may further include determining that a user device is authorized to attach to a cellular network via a MME device (block 420). For example, MME device 130-1 may generate an authorization request for user device 110 based on the information included in attachment request 310. MME device 130-1 may transmit the authorization request to HSS/AAA server 160. HSS/AAA server 160 may retrieve subscriber profile information associated with user device 110. HSS/AAA server 160 may generate an authorization response that includes the subscriber profile information, and may transmit the authorization response to MME device 130-1. MME device 130-1 may receive the authorization response, and may determine, based on the authorization response, that user device 110 is authorized to attach to the cellular network via MME device 130-1.

Process 400 may also include creating and storing a context for the user device (block 430). For example, when MME device 130-1 determines that user device 110 is authorized to attach to the cellular network via MME device 130-1, MME device 130-1 may create a context for user device 110. The context may include information from the attachment request, one or more portions of the subscriber profile information included in the authorization response, and/or an identifier of base station 120. MME device 130-1 may store the context for user device 110.

Process 400 may also include creating an optimized context, for the user device, based on the context (block 440). For example, after creating and/or storing the context, MME device 130-1 may create optimized context 320 (FIG. 3), for user device 110, based on the context. Optimized context 320 may only include a portion of the information included in the context. For example, optimized context 320 may include minimum information required for MME device 130-2 to establish a connection between user device 110 and SGW device 140. As a result, a size of the context may be larger than a size of the optimized context.

Process 400 may also include identifying a backup MME device (block 450) and providing the optimized context to the backup MME device (block 460). In one implementation, MME device 130-1 may be paired with another MME device (e.g., MME device 130-2) that is within pool 135. MME device 130-1 may identify the other MME device 130-2 as a backup MME device of MME device 130-1. MME device 130-1 may provide optimized context 320 to MME device 130-2, and MME device 130-2 may store optimized context 320. Optimized context 320, for user device 110, may occupy less storage space in MME device 130-2 than occupied by the context in MME device 130-1. In some implementations, MME device 130-1 may provide a notification to SGW 140 that indicates that MME device 130-2 serves as a backup MME device of MME device 130-1

Figure 5:
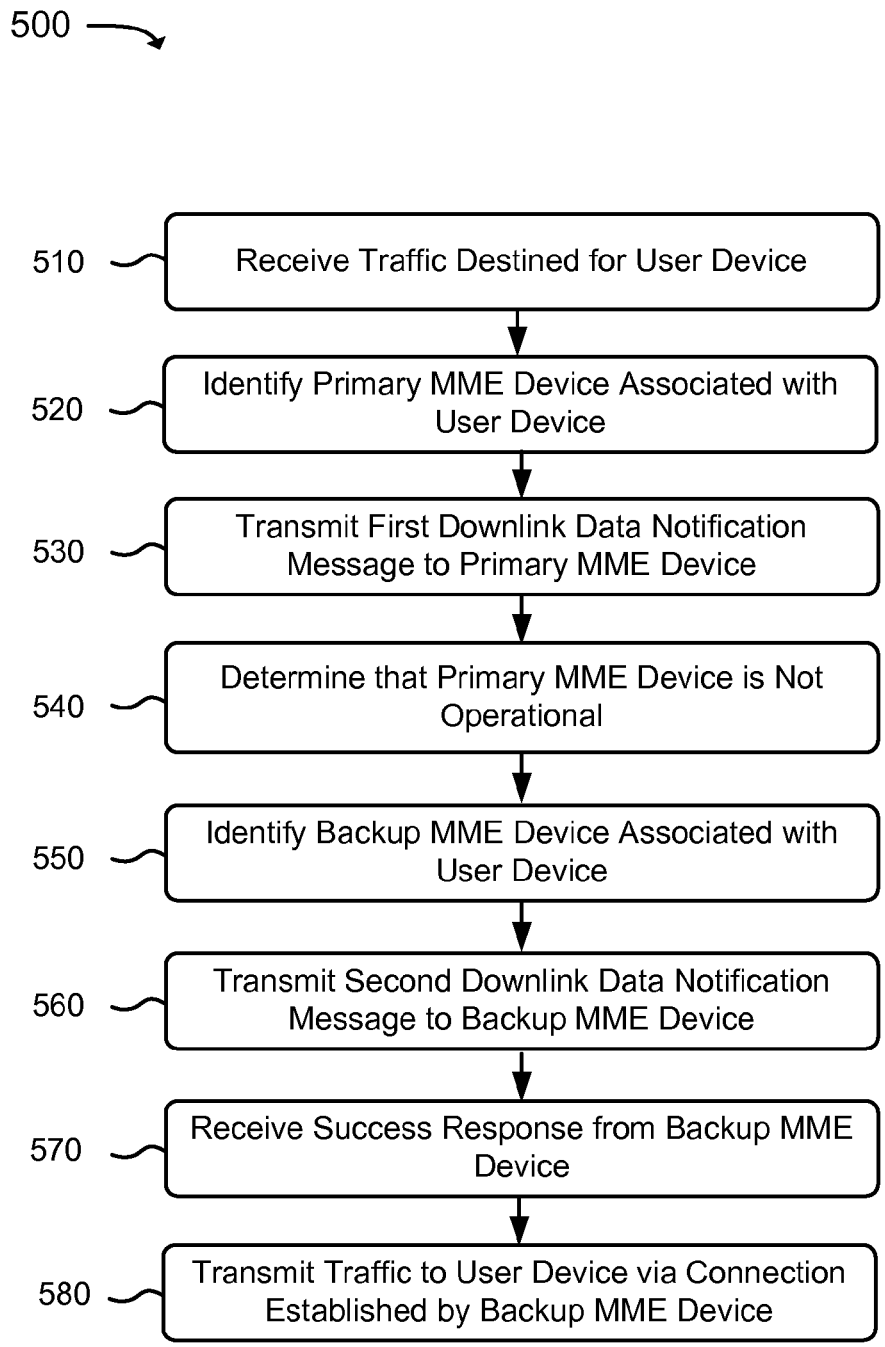
FIGS. 5 and 6 are flow charts of an example process for transmitting traffic to a user device when a primary MME device is not operational.
Figure 6:
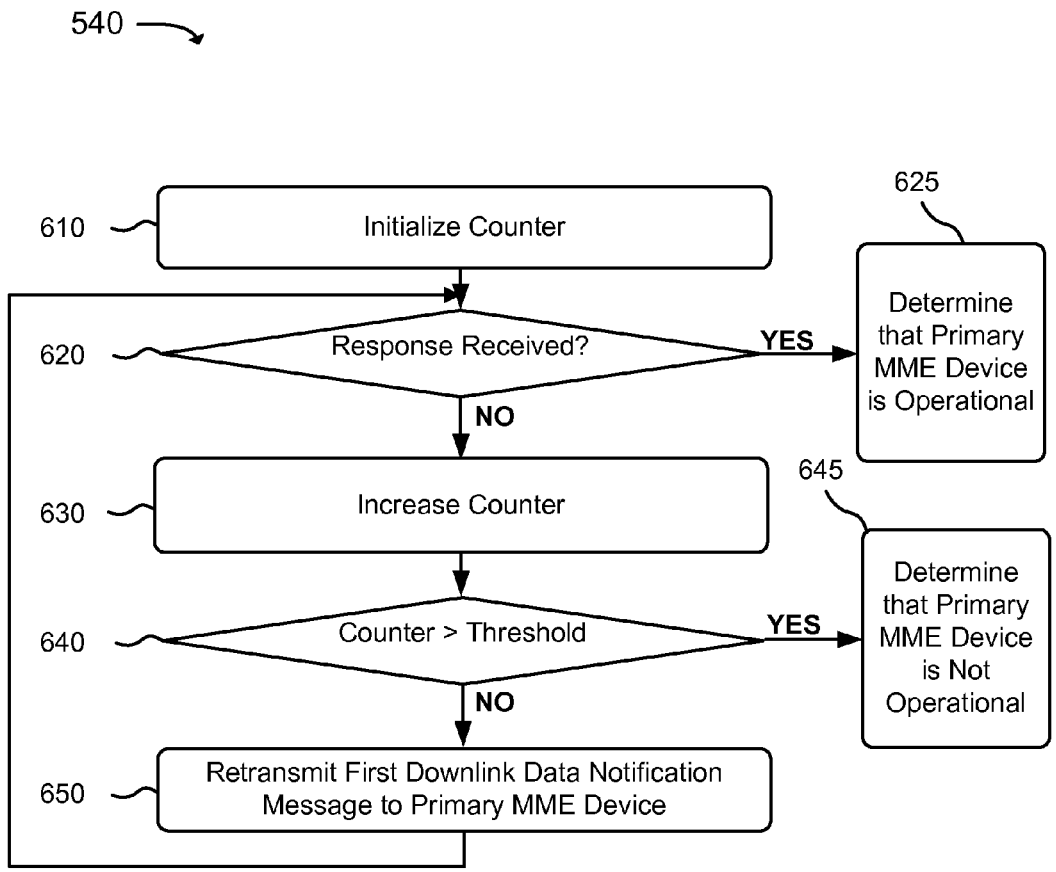

FIGS. 5 and 6 are flow charts of an example process 500 for transmitting traffic to a user device when a primary MME device is not operational. In one implementation, process 500 may be performed by SGW 140. Alternatively, or additionally, some or all of process 500 may be performed by another device or group of devices, including or excluding SGW 140.

As shown in FIG. 5, process 500 may include receiving traffic that is destined for a user device (block 510). For example, SGW 140 may receive traffic 335 (FIG. 3) that is destined for user device 110. SGW 140 may receive traffic 335 from PGW 150 or another network device.

Process 500 may further include identifying a primary MME device associated with the user device (block 520) and transmitting a first downlink data notification message to the primary MME device (block 530). For example, traffic 335 may include an identifier associated with user device 110. SGW 140 may identify, based on the identifier, MME device 130-1 as a primary MME device associated with user device 110. SGW 140 may generate first downlink data notification message 340, and may transmit first downlink data notification message 340 to MME device 130-1. First downlink data notification message 340 may indicate that SGW 140 is requesting a connection to transmit traffic 335 to user device 110.

Process 500 may also include determining that the primary MME device is not operational (block 540). For example, assume that failure 330 (FIG. 3) of MME device 130-1 occurs before MME device 130-1 receives first downlink data notification message 340 from SGW 140. Accordingly, when failure 330 occurs, MME device 130-1 may not be operational, and may not be able to provide a response to first downlink data notification message 340. As described further below with reference to FIG. 6, when SGW 140 does not receive the response from MME device 130-1, SGW device 140 may determine that MME device 130-1 is not operational.

In one example implementation, process block 540 may include the process blocks depicted in FIG. 6. As shown in FIG. 6, process block 540 may include initializing a counter (block 610) and determining whether a response has been received (block 620). For example, SGW 140 may initialize a counter by assigning a value of zero to the counter. SGW 140 may further measure a period of time from when first downlink data notification message 340 is transmitted to MME device 130-1. When the measured period of time is equal to a particular period of time (e.g., one second, two seconds, one minute, etc.), SGW 140 may determine whether SGW 140 has received a response to first downlink data notification message 340 from MME device 130-1.

If the response has been received (block 620—YES), process block 540 may include determining that the primary MME device is operational (block 625). For example, when SGW 140 determines that SGW 140 has received the response to first downlink data notification message 340, SGW 140 may determine that MME device 130-1 is operational.

If the response has not been received (block 620—NO), process block 540 may include increasing the counter (block 630) and determining whether the counter is greater than a threshold (block 640). For example, when SGW 140 determines that SGW 140 has not received the response to first downlink data notification message 340 within the particular period of time, SGW device 140 may increase the value of the counter by a number (e.g., one, two, etc.), and may determine whether the value of the counter is greater than a threshold (e.g., three, four, five, etc.).

If the counter is greater than the threshold (block 640—YES), process block 540 may include determining that the primary MME device is not operational (block 645). For example, when SGW 140 determines that the value of the counter is greater than the threshold, SGW 140 may determine that MME device 130-1 is not operational.

If the counter is not greater than the threshold (block 640—NO), process block 540 may include retransmitting the first downlink data notification message to the primary MME device (block 650). For example, when SGW 140 determines that the value of the counter is less than or equal to the threshold, SGW 140 may retransmit first downlink data notification message 340 to MME device 130-1. After retransmitting first downlink data notification message 340, SGW 140 may determine whether SGW 140 has received a response to the retransmitted first downlink data notification message 340, as described above with regards to block 620.

Returning to FIG. 5, process 500 may also include identifying a backup MME device associated with the user device (block 550). For example, when SGW 140 determines that MME device 130-1 is not operational, SGW 140 may identify MME device 130-2 as a backup MME device that is associated with user device 110. SGW 140 may identify MME device 130-2, as the backup MME device, based on the identifier of user device 110 and/or based on information that indicates that MME device 130-2 serves as a backup for MME device 130-1 within pool 135. In some implementations, before MME device 130-1 is not operational, SGW 140 may receive, from MME device 130-1, MME device 130-2, or from another device, information that indicates that MME device 130-2 serves as the backup MME device of MME device 130-1 within pool 135.

Process 500 may include transmitting a second downlink data notification message to the backup MME device (block 560). For example, SGW 140 may generate second downlink data notification message 350 (FIG. 3), and may transmit second downlink data notification message 350 to MME device 130-2. In one implementation, second downlink data notification message 350 may include the same information, or the same type of information, as included in first downlink data notification message 340.

Process 500 may also include receiving a success response from the backup MME device (block 570) and transmitting the traffic to the user device via a connection established by the backup MME device (block 580). For example, as described further below with reference to FIG. 7, MME device 130-2 may determine that MME device 130-2 stores optimized context 320 for user device 110. MME device 130-2 may use optimized context 320 to establish connection 380 (FIG. 3) between user device 110 and SGW device 140 via base station 120. When MME device 130-2 establishes connection 380, MME device 130-2 may transmit, to SGW 140, success response 360 (FIG. 3) that indicates that MME device 130-2 stores information (i.e., optimized context 320) for user device 110, and identifies base station 120. SGW 140 may receive success response 360, and may transmit traffic 355 to user device 110 via base station 120 by using connection 380.

Figure 7:
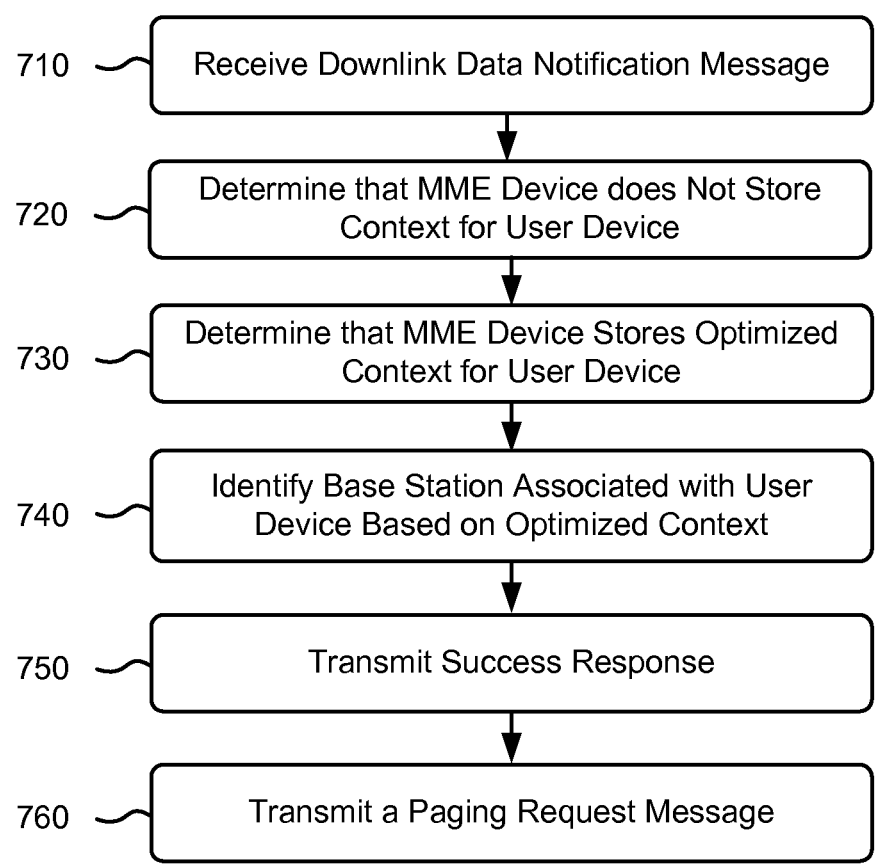
FIG. 7 is a flow chart of an example process for using an optimized context to establish a connection between a serving gateway (SGW) and a user device.

FIG. 7 is a flow chart of an example process 700 for using an optimized context to establish a connection between SGW 140 and user device 110. In one implementation, process 700 may be performed by MME device 130-2. Alternatively, or additionally, some or all of process 700 may be performed by another device or group of devices, including or excluding MME device 130-2.

As shown in FIG. 7, process 700 may include receiving a downlink data notification message (block 710). For example, SGW 140 may transmit second downlink data notification message 350 (FIG. 3) to MME device 130-2 after determining that MME device 130-1 is not operational. MME device 130-2 may receive second downlink data notification message 350 from SGW device 140.

Process 700 may further include determining that MME device 130-2 does not store a context for a user device (block 720) and determining that MME device 130-2 stores an optimized context for the user device (block 730). For example, MME device 130-2 may determine whether MME device 130-2 stores a context for user device 110 that is identified by second downlink data notification message 350. When MME device 130-2 determines that MME device 130-2 does not store the context for user device 110, MME device 130-2 may determine whether MME device 130-2 stores optimized context 320 (FIG. 3) for user device 110. MME device 130-2 may determine that MME device 130-2 stores optimized context 320, which was previously received from MME device 130-1 while MME device 130-1 was operational.

Process 700 may also include identifying a base station associated with the user device based on the optimized context (block 740). For example, optimized context 320 may include an identifier of base station 120, via which user device 110 is connected to a cellular network, associated with MME device 130-2 and SGW 140. MME device 130-2 may identify base station 120 based on the identifier included in optimized context 320.

Process 700 may include transmitting a success response (block 750) and transmitting a paging request message (block 760). For example, MME device 130-2 may generate success response 360 (FIG. 3) that includes the identifier of base station 120. MME device 130-2 may transmit success response 360 to SGW 140. MME device 130-2 may further generate paging request message 370 that indicates that SGW 140 is requesting to transmit traffic 335 (FIG. 3) via base station 120 to user device 110. MME device 130-2 may transmit paging request message 370 to base station 120, and base station 120 may forward paging request message 370 to user device 110. SGW 140 and user device 110 may connect via base station 120, as indicated by connection 380 (FIG. 3), based on information included in success response 360 and paging request message 370. SGW device 140 may transmit traffic 335 to user device 110 via connection 380.

Systems and/or methods described herein may allow MME device 130-2 to establish a connection between SGW 140 and user device 110 based on optimized context 320, which is received from MME device 130-1, when failure 330 of MME device 130-1 occurs. As a result, SGW 140 does not have to wait until user device 110 reattaches to a cellular network, associated with SGW 140, before transmitting traffic 335 to user device 110.

The foregoing description of implementations provides illustration and description, but is not intended to be exhaustive or to limit the implementations to the precise form disclosed. Modifications and variations are possible in light of the above disclosure or may be acquired from practice of the implementations.

Furthermore, while series of blocks have been described with regard to FIGS. 4-7, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device, comprising:
a processor to:
receive traffic destined for a user device,
identify a first mobility management entity (MME) device associated with the user device, wherein the first MME determines, responsive to an authorization request sent from the first MME to a server device, that the user device is authorized to attach to a network via the first MME,
determine that the first MME device is not operational,
identify a second MME device, associated with the user device, which serves as a backup for the first MME device when the first MME device is not operational,
transmit a notification message to the second MME device,
receive a response to the notification message from the second MME device, wherein the response comprises information that indicates that the second MME device stores an optimized context for the user device, and
transmit the optimized traffic to the user device via a base station identified in the response.

2. The device of claim 1 wherein, when determining that the first MME device is not operational, the processor is further to:
transmit another notification message to the first MME device,
initialize a counter,
increase the counter when a response is not received to the other notification message after a particular period of time, and
determine that the first MME device is not operational when the counter is greater than a threshold.

3. The device of claim 2, wherein the other notification message includes same type of information as the notification message.

4. The device of claim 1, wherein, when receiving the traffic, the processor is further to:
receive the traffic from a packet data network (PDN) gateway (PGW).

5. The device of claim 1, wherein the traffic comprises at least one of:
voice data,
audio data,
video data, audio and video data, or textual data.

6. The device of claim 1, wherein the first MME device and the second MME device are within a pool of MME devices that serve a particular geographic area that includes the user device.

7. The device of claim 1, wherein the traffic comprises an identifier associated with the user device, and wherein, when identifying the first MME device, the processor is further to:

identify the first MME device based on the identifier associated with the user device.

8. A non-transitory computer-readable medium, comprising:

one or more instructions that, when executed by one or more processors of a device, cause the one or more processors to:

receive traffic destined for a user device, identify a first mobility management entity (MME) device associated with the user device, wherein the first MME determines, responsive to an authorization request sent from the first MME to a server device, that the user device is authorized to attach to a network via the first MME, determine that the first MME device is not operational, identify a second MME device, associated with the user device, which serves as a backup for the first MME device when the first MME device is not operational, transmit a notification message to the second MME device, receive, from the second MME device, a response to the notification message, wherein the response comprises information that indicates that the second MME device stores an optimized context for the user device, and transmit the optimized traffic to the user device via a base station identified in the response.

9. The non-transitory computer-readable medium of claim 8, wherein, when determining that the first MME device is not operational, the instructions further cause the one or more processors to:

transmit another notification message to the first MME device, initialize a counter, increase the counter when a response is not received to the other notification message after a particular period of time, and determine that the counter exceeds a threshold.

10. The non-transitory computer-readable medium of claim 9, wherein the other notification message includes a same type of information as the notification message.

11. The non-transitory computer-readable medium of claim 8, wherein, when receiving the traffic, the instructions further cause the one or more processors to:

receive the traffic from a packet data network (PDN) gateway (PGW).

12. The non-transitory computer-readable medium of claim 8, wherein the traffic comprises at least one of:

voice data, audio data, video data, audio and video data, or textual data.

13. The non-transitory computer-readable medium of claim 8, wherein the first MME device and the second MME device are within a pool of MME devices that serve a particular geographic area that includes the user device.

14. The non-transitory computer-readable medium of claim 8, wherein the traffic comprises an identifier associated with the user device, and wherein, when identifying the first MME device, the instructions further cause the one or more processors to identify the first MME device based on the identifier associated with the user device.

15. A method comprising:

receiving, at a device, traffic destined for a user device, identifying, at the device, a first mobility management entity (MME) device associated with the user device, wherein the first MME determines, responsive to an authorization request sent from the first MME to a server device, that the user device is authorized to attach to a network via the first MME, determining, at the device, that the first MME device is not operational, identifying, at the device, a second MME device, associated with the user device, which serves as a backup for the first MME device when the first MME device is not operational, transmitting, by the device, a notification message to the second MME device, receiving, at the device from the second MME device, a response to the notification message, wherein the response comprises information that indicates that the second MME device stores an optimized context for the user device, and transmitting, by the device, the optimized traffic to the user device via a base station identified in the response.

16. The method of claim 15, wherein determining that the first MME device is not operational comprises:

transmitting another notification message to the first MME device, wherein the other notification message includes a same type of information as the notification message, initializing a counter, increasing the counter when a response is not received to the other notification message after a particular period of time, and determining that the counter exceeds a threshold.

17. The method of claim 15, wherein receiving the traffic comprises:

receiving the traffic from a packet data network (PDN) gateway (PGW).

18. The method of claim 15, wherein the traffic comprises at least one of:

voice data, audio data, video data, audio and video data, or textual data.

19. The method of claim 15, wherein the first MME device and the second MME device are within a pool of MME devices that serve a particular geographic area that includes the user device.

20. The method of claim 15, wherein the traffic comprises an identifier associated with the user device, and wherein identifying the first MME device comprises identifying the first MME device based on the identifier associated with the user device.

* * * * *